(12) United States Patent
Eisenlohr et al.

(10) Patent No.: US 11,648,763 B2
(45) Date of Patent: May 16, 2023

(54) METHOD OF APPLYING AN ADHESIVE FILM TO A COMPONENT AND TOOL SUITABLE THEREFOR

(71) Applicant: Karl Wörwag Lack- und Farbenfabrik GmbH & Co. KG, Korntal-Münchingen (DE)

(72) Inventors: Jörg Eisenlohr, Nagold (DE); Daniel Mencel, Esslingen (DE); Helge Warta, Ditzingen (DE)

(*) Notice: Subject to any disclaimer, the term of this patent is extended or adjusted under 35 U.S.C. 154(b) by 0 days.

(21) Appl. No.: 17/483,109

(22) Filed: Sep. 23, 2021

(65) Prior Publication Data

US 2023/0092754 A1    Mar. 23, 2023

(51) Int. Cl.
| | |
|---|---|
| *B32B 37/10* | (2006.01) |
| *C09J 5/00* | (2006.01) |
| *B32B 37/00* | (2006.01) |
| *C09J 7/29* | (2018.01) |

(52) U.S. Cl.
CPC ...... *B32B 37/1027* (2013.01); *B32B 37/0046* (2013.01); *C09J 5/00* (2013.01); *C09J 7/29* (2018.01); *C09J 2203/354* (2020.08); *C09J 2400/163* (2013.01)

(58) Field of Classification Search
CPC .... B32B 37/1027; B32B 37/0046; C09J 5/00; C09J 7/29; C09J 2203/354; C09J 2400/163
See application file for complete search history.

(56) References Cited

U.S. PATENT DOCUMENTS

| | | |
|---|---|---|
| 6,197,397 B1 | 3/2001 | Sher et al. |
| 6,199,613 B1 * | 3/2001 | Petillon ............ B29C 63/16 156/580 |

(Continued)

FOREIGN PATENT DOCUMENTS

| | | |
|---|---|---|
| CA | 3 118 115 A1 | 7/2020 |
| DE | 10 2020 119 033 A1 | 1/1922 |

(Continued)

OTHER PUBLICATIONS

DE102017208038A1 Machine Translation (Year: 2018).*

(Continued)

*Primary Examiner* — Francisco W Tschen
*Assistant Examiner* — Abhishek A Patwardhan
(74) *Attorney, Agent, or Firm* — DLA Piper LLP (US)

(57) ABSTRACT

A method of applying an adhesive film to a component includes applying an adhesive film to a surface of a component, wherein the adhesive film is positioned between the surface and an elastic membrane, the elastic membrane is transferred into a curved state with a convex and a concave side and contacted with the surface with the convex side first such that an adhesive layer of the adhesive film is pressed onto the surface in a full-area by the elastic membrane, the adhesive layer is pressed onto the surface in a full-area by a negative pressure being applied to that side of the elastic membrane facing towards the adhesive film, and to stabilize the component against deformation brought about by this negative pressure, the elastic membrane along with the adhesive film is pushed against the surface of the component with a plunger means.

13 Claims, 1 Drawing Sheet

(56) References Cited

U.S. PATENT DOCUMENTS

| | | | | |
|---|---|---|---|---|
| 2015/0352822 A1* | 12/2015 | Niebling | ............... | B32B 38/10 |
| | | | | 156/580 |
| 2016/0194097 A1* | 7/2016 | Graves | ................. | B64G 4/00 |
| | | | | 156/391 |
| 2020/0156334 A1* | 5/2020 | Harris | ................. | B29C 73/06 |
| 2022/0134680 A1* | 5/2022 | Warta | ................ | B29C 65/5092 |
| | | | | 156/60 |

FOREIGN PATENT DOCUMENTS

| | | |
|---|---|---|
| DE | 198 12 402 A1 | 9/1999 |
| DE | 10 2007 057 175 A1 | 5/2009 |
| DE | 102017208038 A1 * | 11/2018 |
| WO | 2020/148070 A1 | 7/2020 |

OTHER PUBLICATIONS

Office Action dated Apr. 21, 2021, of counterpart German Patent Application No. 10 2020 119 033.6, along with an English translation.

* cited by examiner

METHOD OF APPLYING AN ADHESIVE FILM TO A COMPONENT AND TOOL SUITABLE THEREFOR

TECHNICAL FIELD

This disclosure relates to a method and a tool that applies an adhesive film to a component.

BACKGROUND

Adhesive films are used in many fields of application, for example, decorative purposes, for instance transferring a color pattern to a surface, functional reasons, for instance, as protection for painted surfaces, or application of inscriptions and the like. In particular, adhesive films are finding increasing use in the series production of motor vehicles, for example, as stone chip protection, application of model designations and, of course, for visual design.

In general, the effort involved, for instance, in the application of a color pattern by an adhesive film is considerably lower than in formation of such patterns in a multi-stage painting process. However, application of adhesive films in series production is anything but trivial. The larger the adhesive film, the more difficult it is to position it correctly on the surface to be provided with adhesive and adhesively bond it without air inclusions and formation of folds. Automation of these processes has up to now not been successful. Application of adhesive films, for example, in the series production of motor vehicles has so far been carried out manually.

U.S. Pat. No. 6,197,397 B1 discloses adhesive films comprising microstructured channels inside the adhesive layer. These channels are intended to allow air to escape during application of the adhesive films to avoid air inclusions and make manual reworking to remove the same superfluous. They are therefore better suited for automated processing than conventional adhesive films without the microstructured channels.

However, such adhesive films are very expensive. Furthermore, owing to the microstructured adhesive layer, they are less suitable for formation of high-quality surfaces. Adhesive films generally comprise a carrier film, one side of which is covered with an adhesive layer and the other side of which is covered with an optionally multilayered paint layer. When using very thin carrier films, the microstructure still leaves visible traces behind, even after being adhesively bonded on. The use of particularly thick adhesive films is fundamentally not desired. The problem can indeed be solved with thick films. However, these lie heavily on the substrate. If a clear coat is not painted over it, this also leads to results that are not satisfactory.

PCT/EP2019/086500 discloses a method and a tool that applies an adhesive film to the surface of a tool which address the stated problems. For this purpose, an adhesive film comprising an adhesive layer is positioned between the surface to be provided with adhesive and an elastic membrane with the aid of an automated system. As a consequence of a negative pressure applied between the membrane and the surface, the membrane curves, with formation of a convex and a concave side, in the direction of the surface until it contacts the surface with the convex side first such that the adhesive layer of the adhesive film is pressed onto the surface in a full-area manner by the membrane. The degree of curvature of the membrane is regulated by coordination of the pressure ratios on both sides of the membrane. It is, for example, possible for the curvature of the membrane generated through application of the negative pressure to be supported by a corresponding positive pressure on the rear side of the membrane.

That procedure leads to excellent results in solid, structurally reinforced workpieces. However, problems occur when, for example, a very thin, flexible metal sheet is to be coated. Due to application of the mentioned negative pressure, it is possible to deform not only the membrane but also the metal sheet, possibly permanently for the latter. In addition, deformation of the surface to be provided with adhesive makes it difficult to control the process since the distance between the surface and the membrane can change in a sudden and uncontrolled manner.

A method which is related and yet very different in terms of details is disclosed in DE 198 12 402 A1. DE '402 concerns the application of films to workpieces such as body sheets. For this purpose, the film to be applied is transferred into a convex shape and pushed onto the surface to be coated. This takes place with the aid of a frame into which a membrane on which the film is fixed is clamped. The film is pressed on by negative pressure. In contrast to the method described in PCT '500, however, coordination of the pressure ratios on both sides of the membrane is not described. Instead, the rear space behind the membrane is filled with an elastic foam.

It could therefore be helpful to provide an automatable method and a tool that applies adhesive films that can be integrated in series production, for example, in a production line intended for production of motor vehicles.

SUMMARY

We provide a method of applying an adhesive film to a component including providing a component, providing an adhesive film including an adhesive layer, applying the adhesive film to a surface of the component, wherein, to apply the adhesive film: the adhesive film is positioned between the surface of the component and an elastic membrane, the elastic membrane is transferred at least in certain regions into a curved state with a convex and a concave side and is brought into contract with the surface of the component with the convex side first such that the adhesive layer of the adhesive film is pressed onto the surface of the component in a full-area manner by the elastic membrane, the adhesive layer of the adhesive film is pressed onto the surface of the component in a full-area manner by a negative pressure being applied to that side of the elastic membrane facing towards the adhesive film, and to stabilize the component against deformation brought about by this negative pressure, the elastic membrane along with the adhesive film is pushed against the surface of the component with a plunger means.

We also provide a tool that applies an adhesive film to a surface of a component according to the method of applying an adhesive film to a component including providing a component, providing an adhesive film including an adhesive layer, applying the adhesive film to a surface of the component, wherein, to apply the adhesive film: the adhesive film is positioned between the surface of the component and an elastic membrane, the elastic membrane is transferred at least in certain regions into a curved state with a convex and a concave side and is brought into contract with the surface of the component with the convex side first such that the adhesive layer of the adhesive film is pressed onto the surface of the component in a full-area manner by the elastic membrane, the adhesive layer of the adhesive film is pressed onto the surface of the component in a full-area manner by a negative pressure being applied to that side of the elastic membrane facing towards the adhesive film, and to stabilize the component against deformation brought about by this negative pressure, the elastic membrane along with the adhesive film is pushed against the surface of the component with a plunger means, including an elastic membrane that presses the adhesive film onto the surface of the component in a full-area manner, at least one means for positioning the adhesive film between the surface of the component and the elastic membrane, means for generating a negative pressure on a side of the elastic membrane facing towards the adhesive film and/or means for generating a negative pressure on a side of the elastic membrane facing away from the adhesive film, and at least one plunger that pushes the elastic membrane along with the adhesive film against the surface of the component to stabilize the component during application of the adhesive film.

DETAILED DESCRIPTION

Our method of applying an adhesive film always comprises the steps:
a. providing a component,
b. providing an adhesive film which comprises an adhesive layer, and
c. applying the adhesive film to a surface of the component.

For application of the adhesive film in accordance with aforementioned c., the following are provided:
d. the adhesive film is positioned between the surface of the component and an elastic membrane,
e. the elastic membrane is transferred at least in certain regions into a curved state with a convex and a concave side and is brought into contact with the surface of the component with the convex side first such that the adhesive layer of the adhesive film is pressed onto the surface of the component in a full-area manner by the elastic membrane,
f. the adhesive layer of the adhesive film is pressed onto the surface of the component in a full-area manner by a negative pressure being applied to that side of the elastic membrane which faces towards the adhesive film, and
g. to stabilize the component against deformation brought about by this negative pressure, the elastic membrane along with the adhesive film is pushed against the surface of the component with the aid of a plunger means.

The use of the membrane is particularly important for the method. The membrane is preferably configured as a layer composed of an elastic material and comprises two flat sides that are situated opposite one another. To push the elastic membrane against the surface of the component, the plunger means is preferably positioned such that it is able to exert a pressure on that side of the membrane facing away from the adhesive film.

Particularly preferably, to stabilize the component against the deformation brought about by the negative pressure, the elastic membrane along with the adhesive film is pushed against the surface of the component with the aid of the plunger means such that the adhesive layer of the adhesive film is pressed onto the surface in a punctiform contact region. The punctiform contact region arises from the membrane curvature having already resulted from the plunger means pushing against that side of the membrane facing away from the adhesive film. Furthermore, it also results from application of the negative pressure. The negative pressure and the plunger means can bring about the curvature independently of one another and together.

In each instance, first of all the highest point of the curvature pushes the adhesive film onto the surface in the punctiform contact region. When the negative pressure is increased, other regions of the membrane are also pulled against the surface. The contact region then spreads out radially until the adhesive layer contacts the surface in a full-area manner.

In particular, the plunger means is positioned relative to the membrane such that the membrane curves in the direction of the component as a result of the pressure of the plunger means, and contact of the surface with the membrane or with the adhesive film positioned between the membrane and the surface is effected where the membrane or the adhesive film would first come into contact with the surface even without the plunger means, that is to say only pulled by the negative pressure.

Preferably, in the method, the membrane and the adhesive film are positioned above the surface to be provided with adhesive such that the initial contact region is formed in a central region of the adhesive film and the surface to be provided with adhesive, with the result that the contact region spreads out from there in the direction of the edges of the adhesive film. This minimizes the risk of air inclusions.

In a conventional manual application of an adhesive film, such an approach is rarely possible. To ensure correct positioning of the adhesive film on the surface during a manual application, an edge of an adhesive film must always be manually aligned and pushed on first.

To set the negative pressure, a pressure difference between the two flat sides of the membrane is set, preferably by that side of the elastic membrane facing towards the adhesive film having a lower pressure applied to it than the side facing away from the adhesive film. Consequently, the elastic membrane is pulled or pushed, depending on the viewpoint, in the direction of the component, with the result that the adhesive film can be pressed onto the surface of the component.

As mentioned above, application of the negative pressure in pressure-sensitive components, for example, in thin metal sheets, may bring about undesired deformation of the components. Our method uses the plunger means which, during this process, pushes against the surface of the component and thus protects the component against deformation in the direction of the membrane and the adhesive film, in particular against curvature directed towards the adhesive film. Such a curvature would first make uniform application of the adhesive film to the component more difficult, particularly if this curvature occurs suddenly. Second, such a curvature could result in permanent deformation of the component, which is of course also not desirable. These problems do not occur when the plunger means is being used to stabilize the component, and therefore our method is particularly advantageously suitable for the application of adhesive films to structurally weak and/or very flexible components.

The pressure difference can be formed in different ways. By way of example, atmospheric pressure (1 bar) may be set in the region between the elastic membrane and the surface of the component and a pressure higher than atmospheric pressure on the other side of the elastic membrane.

Particularly preferably, to set the pressure difference, at least one of the additional a. to c. directly below is provided:

a. the negative pressure applied to that side of the elastic membrane which faces towards the adhesive film is present relative to a pressure which is applied to that side of the elastic membrane which faces away from the adhesive film and/or a pressure which is applied to a rear side of the component,
b. the negative pressure is a pressure <1 bar, and
c. to set the negative pressure, a negative-pressure chamber, which is delimited by that side of the membrane which faces towards the adhesive film, and a pressure equalizing chamber, which is delimited by that side of the membrane which faces away from the adhesive film, are evacuated, whereupon the pressure equalizing chamber is vented.

Preferably, a. and b. and c. directly above are implemented in combination.

In these preferred and advantageous examples of the method, the negative pressure set is a pressure<atmospheric pressure, a higher pressure, for example, atmospheric pressure, prevailing on the other side of the membrane relative thereto. Preferably, the negative pressure is 0.01 mbar to 1 bar, particularly preferably 0.01 mbar to 750 mbar.

Depending on the size of the component and the area to be provided with adhesive, one or more plunger means may be provided. If a single plunger means is provided, this plunger means is preferably arranged such that it pushes the membrane along with the adhesive film against a central region of the area to be provided with adhesive. In a plurality of plunger means, several points for pressure contact are provided to be distributed over the surface to be provided with adhesive.

The plunger means preferably comprises at least one extendable piston equipped with a plunger head, for example, with a rounded plunger head. A rounded plunger head is particularly advantageous since no imprints or similar on the surface of the component are thereby generated. The piston may be extended in particular by an actuable cylinder. In some examples, the plunger head itself is of elastic configuration or is covered with an elastic material.

With regard to the extension of the at least one plunger means, that is to say with regard to the advancement of the plunger means, our method is particularly preferably characterized by a. directly below:
a. the plunger head is advanced in coordination with the setting of the negative pressure.

In other words, the setting of the pressure difference, which leads to a deflection of the elastic membrane, and the advancement of the plunger means are preferably coordinated with one another.

In connection with the coordination of the setting of the pressure difference and the extension of the plunger means, at least one of a. and b. directly below is preferably provided:
a. the advancement of the plunger head is coordinated with the setting of the negative pressure by temporal coordination, and
b. the advancement of the plunger head is coordinated with the setting of the negative pressure in dependence on the negative pressure actually set.

The plunger means is particularly preferably pushed on in a controlled or regulated shape. In this example, the actuation of the plunger means is in particular designed such that the force acting on the component as a result of the pressure difference during the process of applying the film is compensated and thus force equalization occurs.

It is particularly preferred that the advancement of the plunger means and the setting of the pressure difference, in particular the setting of a negative pressure, take place in a time-parallel manner. It is expediently taken into account that in pressure-sensitive components, deformation may start right at the beginning of the evacuation such that the plunger means is advantageously extended so that it contacts the component right at the beginning of the evacuation.

Provision may be made for the plunger means to be extended in a time-dependent manner. By way of example, the plunger means may be extended after a few seconds or a predefinable time interval, for example, 2 s or 3 s or 4 s or 5 s, has lapsed after the start of an evacuation operation.

In other examples, the plunger means may be extended in dependence on an actually measured pressure acting on the membrane, that is to say in particular when a predefinable pressure threshold is undershot during the setting of the negative pressure. In this example, one or more pressure sensors may advantageously be used. It is, for example, possible for the plunger means to be extended once a pressure of 100 mbar or another pressure threshold has been reached. Such a regulation can in particular also be coordinated with the component to be provided with adhesive, in particular can be varied in dependence on the pressure sensitivity of the respective component.

A particularly preferred example of our method is distinguished by the additional steps a. to d. directly below:
a. in a first step, the elastic membrane is brought up to the surface of the component by the automated system,
b. in a second step, the negative pressure is applied in the region between the surface of the component that is to be provided with adhesive and the elastic membrane,
c. in a third step, the elastic membrane along with the adhesive film is pushed against the surface of the component with the aid of the plunger means, and
d. the negative pressure is intensified until the adhesive layer of the adhesive film is pressed onto the surface in a full-area manner by the membrane.

In this example, a temporal overlap of step a. with the other steps is fundamentally not possible. Steps b. and c. and d. can overlap in principle. In some preferred examples, however, step c. is concluded prior to step b. and d.

In the context of step a. directly above, the expressions "bringing up to" and "brought up to" should be interpreted very broadly. To bring the membrane up to the surface, it is of course possible in the simplest instances for the membrane to be moved towards the surface, but it is conversely also quite possible for the surface itself to be moved towards the membrane. Only the distance between the surface and the membrane is of interest during the bringing up operation. Whether the membrane or the surface or both are moved to reduce the distance is not significant.

A negative pressure applied between the surface to be provided with adhesive and the elastic membrane can, as already indicated above, be varied in preferred examples to compensate a press-on pressure. Correspondingly, in preferred examples, our method is distinguished by a. directly below:
a. the negative pressure is varied in dependence on the pressure that the membrane exerts over the adhesive film onto the surface to be provided with adhesive.

For this purpose, an automated control or regulating mechanism may be provided, which automatically adapts the negative pressure in dependence on the desired press-on pressure. The actual pressures may preferably be detected by sensors.

In a further preferred example, our method is distinguished by at least one of steps a. and b. directly below:

a. the membrane is transferred into the curved state by a positive pressure or with the aid of a positive pressure, and
b. the membrane is heated or cooled before the adhesive film is pressed on.

As an alternative to the negative pressure described above, the process can be performed using positive pressure. It is essential to the method that the aforementioned curvature is produced, and it is of secondary importance whether formation of the curvature is assisted or brought about by a negative pressure or a positive pressure.

Heating of the membrane can be performed completely independently of the use of negative and positive pressure. Heating or cooling of the membrane makes it possible to counteract, for example, shrinkage or stretching effects.

Further preferably, the elastic membrane used in the method is distinguished by at least one of a. to c. directly below:
a. the elastic membrane is composed of an elastic polymer material, in particular of natural rubber or silicone,
b. the elastic membrane has a uniform thickness, and
c. the elastic membrane has weakened regions and/or reinforcing regions that influence the geometry of the curved state in a targeted manner.

Either a. and c. or b. and c. directly above are particularly preferably implemented in combination with one other.

Influencing of the geometry of the curved state of the membrane may be beneficial when forming the punctiform contact region mentioned above. If there is, for instance, a depression in the surface to be provided with adhesive, the punctiform contact region should ideally be produced at the deepest point of the depression. It may be preferable to avoid formation of a circular contact region since otherwise air inclusions may occur.

If the elastic membrane is, for example, configured to be thinner in one region than in another region, then it will curve more easily and to a more pronounced extent in this region than in the other regions when a pressure or negative pressure is being applied. The reverse applies in a reinforcement of the elastic membrane.

The introduction of weakened regions and/or reinforcing regions into the elastic membrane may furthermore be expedient to influence the expansion of the contact region. This can be advantageous particularly when adhesively bonding the adhesive film to curved surfaces, in particular to surfaces with depressions.

Particularly preferably, our claimed method is distinguished by at least one of steps a. to c. directly below:
a. the adhesive film is positioned between the surface and the elastic membrane with the aid of a mounting film, to which the adhesive film adheres by way of its side which faces away from the adhesive layer,
b. to position the adhesive film, the mounting film is fixed on or in a frame, and
c. after the adhesive film has been pressed onto the surface, the mounting film is pulled off from the adhesive film.

Particularly preferably, at least steps a. and c. directly above are implemented in combination with one another, particularly preferably all steps a. to c.

Since the adhesive film, including its edges, is generally intended to be pressed onto the surface to be provided with adhesive, the mounting film makes positioning thereof easier. After the adhesive film has been pressed on, the mounting film is preferably pulled off from the adhesive film.

The mounting film is preferably configured to be fixed on the frame. For this purpose, the mounting film may have positioning and fixing means which make the fixing on the frame easier.

The adhesive film is, for example, a decoration, an inscription or one or more individual letters or decorative elements which are intended to be applied to the surface to be provided with adhesive.

It is possible for several adhesive films adhering to the mounting film to be simultaneously transferred to the surface to be provided with adhesive, for example, if an inscription comprising several letters or words is intended to be transferred to the surface. In this example, it is preferable to position the membrane and the adhesive film above the surface to be provided with adhesive such that the initial contact region is formed in a central region of the inscription formed from several adhesive films.

A particular advantage of our method is that it can be automated. The method is therefore particularly preferably carried out with the aid of an automated system. In particular, in this example, the method can particularly advantageously be used, for example, in production of motor vehicles. In this example, the component to be provided with adhesive is preferably a motor vehicle body or a part of a motor vehicle body or an attachment part of a motor vehicle. In this example, the method comprises preferably two or more, in particular all, of steps a. to d. directly below:
a. coating a motor vehicle body or parts of a motor vehicle body with at least one paint,
b. drying and/or hardening the at least one paint,
c. optionally mounting attachment parts on load-bearing component parts of the motor vehicle body which has been coated with the at least one paint that has been dried and/or hardened, and
d. applying the adhesive film, which comprises an adhesive layer, to a surface of the motor vehicle body which has been coated with the at least one paint that has been dried and/or hardened or parts of the motor vehicle body or one of the attachment parts mounted thereon.

Application of the adhesive film in accordance with aforementioned d. is effected in the manner described above, wherein at least one plunger means is utilized to stabilize the shape of the component during application of the adhesive film and to avoid deformation.

The at least one paint is preferably a customary multilayered automotive paint. Bodies and body parts are generally primed, painted with a base coat and finally provided with a clearcoat coating. The working and intermediate steps required for this are known. It is only important that the at least one paint is dried and hardened on the substrate to be provided with adhesive, that is to say offers a pressure-resistant surface and no longer contains any solvent. Application of a clear coat is generally not required or not provided after application of our adhesive film.

The term "attachment part" is to be interpreted broadly. This includes, on the one hand, non-painted parts such as windows or headlights, but also, on the other hand, painted parts such as a bonnet, a door, a wing and a roof element or colored plastics parts. If appropriate, a paint was applied to these attachment parts separately from the motor vehicle body and dried and/or hardened.

Preferably, the adhesive film that can be used in the method is distinguished by at least one of a. to h. directly below:
a. the adhesive film comprises a carrier film which has the adhesive layer on one side and a paint layer on another side, b. the carrier film is a plastics film, a metal film or a metal-plastic composite film,
c. the carrier film has a thickness of 10 μm to 120 μm,
d. the adhesive layer has a thickness of 10 μm to 80 μm, preferably 30 μm to 60 μm,
e. the adhesive layer has a uniform thickness,
f. the adhesive layer is composed of a homogeneous adhesive composition,
g. the adhesive layer has a surface area in the range of 10 cm$^2$ to 8 m$^2$, and
h. the paint layer has a thickness of 20 μm to 150 μm, preferably 30 μm to 90 μm, particularly preferably 40 μm to 60 μm.

At least a. and b. and g. directly above are particularly preferably implemented in combination with one another. Preferably, a. to d. and g. and h., in particular a. to e. and g. and h., particularly preferably all of a. to h., are implemented in combination with one another.

e. is particularly preferably implemented in combination with f. A uniform thickness is to be understood to mean that the adhesive layer is not weakened locally by microstructure channels for discharging air or other microstructures. The adhesive layer is preferably formed by applying a homogeneous adhesive composition by a doctor blade and correspondingly has a substantially planar and uniform surface. "Homogeneous" means that the adhesive composition contains no particles, in particular visible particles.

The use of microstructure-free adhesive layers makes it possible to be able to use adhesive films with very thin carriers in our method and to nevertheless obtain a highly reflective "Class A surface" in the process. Within 10 μm to 120 μm indicated above, further preference is given to carrier films having a thickness of 10 μm to 60 μm, preferably 10 μm to 40 μm, particularly if the adhesive layer is free of the aforementioned microstructures.

We furthermore provide that a tool that applies an adhesive film to a surface of a component. This tool is particularly suitable for carrying out the method described. The tool is always distinguished by:
a. it comprises an elastic membrane, in particular in one of the examples described above, for pressing the adhesive film onto the surface of the component in a full-area manner,
b. it comprises at least one means for positioning the adhesive film between the surface of the component and the elastic membrane,
c. it comprises a means for generating a negative pressure on that side of the elastic membrane which faces towards the adhesive film and/or a means for generating a negative pressure on that side of the elastic membrane which faces away from the adhesive film, and
d. it comprises at least one plunger means for pushing the elastic membrane along with the adhesive film against the surface of the component to stabilize the component during the application of the adhesive film.

The tool can be used in particular to apply the adhesive film described above to the painted surface, also described above, of a motor vehicle body or of an attachment part mounted thereon.

Particularly preferably, the tool has the following additional:
a. it comprises a frame which is configured to form, together with the surface, which is to be provided with adhesive, and the elastic membrane, a negative-pressure chamber in which the adhesive film is arranged and into which the elastic membrane can curve when a negative pressure is being applied to the negative-pressure chamber.

As already described, it is particularly advantageous for a negative pressure to be applied in the region between the surface to be provided with adhesive and the elastic membrane when the adhesive film is being applied. The frame is provided for this purpose.

The elastic membrane may be of double-walled configuration for the purposes of temperature control and have connections for a temperature-control means such as, for example, water.

Particularly preferably, the membrane has the weakened regions and/or reinforcing regions described above.

Since the adhesive film preferably adheres to the mounting film described above, the means for fixing the adhesive film is correspondingly preferably a means for fixing the mounting film.

The means for fixing the adhesive film or the mounting film may, for example, be pins or hooks that correspond to holes in the adhesive film or mounting film.

Preferably, the tool is distinguished by at least one of a. to f. directly below:
a. the frame is of rectangular configuration,
b. the frame has a first opening which is closed by the membrane,
c. the frame comprises at least one elastic sealing element which can rest sealingly on the surface,
d. the frame comprises a second opening, the at least one elastic sealing element being fixed to the edges of the second opening,
e. the frame comprises at least one connection for a negative-pressure source, via which negative pressure can be applied to the negative-pressure chamber, and
f. the frame comprises at least one holder as a means for fixing the adhesive film.

Preferably, at least a. to e. directly above are implemented in combination with one another, particularly preferably all a. to f.

The at least one sealing element is used to seal the negative-pressure chamber. They are preferably composed of elastic polymer materials, for example, of the natural rubber already mentioned. The at least one connection for the negative-pressure source is used to generate the negative pressure in the negative-pressure chamber.

Further preferably, the tool is distinguished by at least one of a. to d. directly below:
a. the frame is assembled from two or more sub-frames,
b. the frame is of rectangular configuration and assembled from the two or more rectangular sub-frames,
c. the frame comprises a first rectangular sub-frame, on which the at least one elastic sealing element is fixed and which comprises the at least one connection for the negative-pressure source, and
d. the frame comprises a second rectangular sub-frame, which comprises the at least one holder for the adhesive film.

Preferably, at least a. to c. directly above are implemented in combination with one another, particularly preferably all of a. to d.

When using two or more sub-frames, it may be necessary to provide further seal elements on connecting surfaces of the sub-frames to ensure the tightness of the negative-pressure chamber.

For the purpose of the above-described control or regulation of the negative pressure, the tool may have a suitable control or regulating device.

Further preferably, the tool is distinguished by at least one of a. to c. directly below, preferably by a combination of a. and b. or a. and c. directly below:

a. it comprises a pressure equalizing chamber which is delimited, inter alia, by the membrane,
b. it comprises at least one connection for a pressure source or a negative-pressure source, the at least one connection leading into the pressure equalizing chamber, and
c. it comprises at least one valve via which the pressure equalizing chamber can be vented.

This pressure equalizing chamber is optionally required to generate or increase the described curvature of the elastic membrane. When a negative pressure is applied in the negative-pressure chamber, it may be completely sufficient for this purpose to vent the pressure equalizing chamber via the valve to bring about or increase the required curvature of the membrane.

The tool is particularly preferably fixed on an automated system, for example, the arm of a robot. The tool, preferably including the automated system, is preferably arranged in a production line for producing motor vehicles.

In principle, the described method and the described tool are of course suitable not only for use in the production of motor vehicles. By way of example, other series products can also be provided with adhesive films, for example, bicycles.

Further features and advantages of our methods and tools emerge from the drawings described below in which preferred examples of the tools are illustrated in various stages of the method. The examples illustrated and described serve merely for explanation and for better understanding and should in no way be understood to be limiting.

Figure 1:
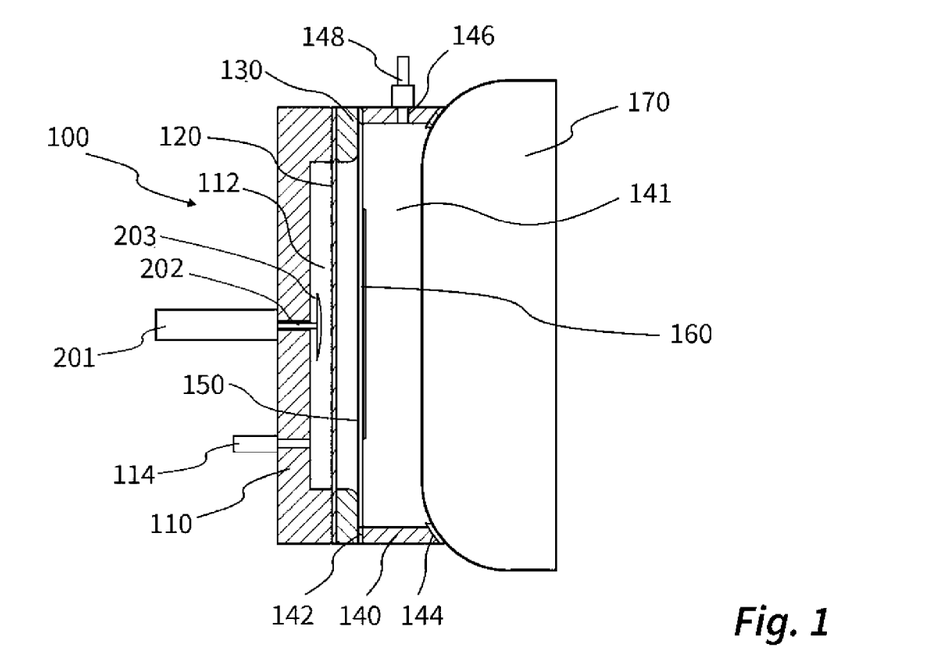
FIG. 1 shows a sectional illustration through a tool prior to or at the beginning of the performance of our method.
Figure 2:
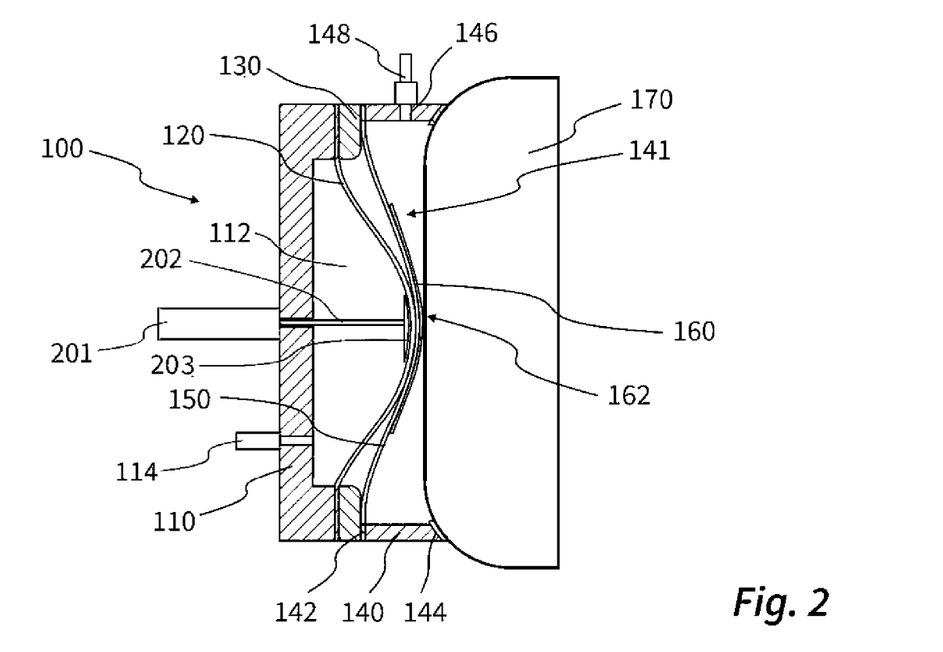
FIG. 2 shows a sectional illustration through a tool during the performance of our method.

FIGS. 1 and 2 show, in cross section, a tool 100 intended to apply an adhesive film 160 to the surface of a component 170, for example, to a painted surface of a motor vehicle.

The tool 100 comprises a rectangular frame assembled from a rectangular sub-frame 130 and a rectangular sub-frame 140 (negative-pressure frame). The sub-frames 130 and 140 are connected in an air-tight manner via a seal 142. A mounting film 150 is fixed on the sub-frame 130 by a plurality of pins or similar fixing means (not visible here). For this purpose, the mounting film 150 may have a plurality of holes via which it can be suspended on the pins or generally on corresponding fixing means.

An elastic membrane 120, for example, composed of natural rubber is arranged parallel to the mounting film 150. The elastic membrane is clamped in between a base plate 110 and the sub-frame 130 in an air-tight manner. It closes the opening of the frame that is defined by the sub-frame 130. For the clamping operation, it is, for example, possible for a plurality of screws or other fixing means (not visible here) to be screwed through the sub-frame 130 into the base plate 110.

The base plate 110, together with the membrane 120, encloses a pressure equalizing chamber 112. Air can be admitted into the pressure equalizing chamber 112 via a valve 114.

A substructure, via which a connection of the tool 100 to a lifting tool or a robot can be provided, may be attached on that side of the base plate 110 which faces away from the elastic membrane 120.

The adhesive film 160 which is intended to be transferred to the surface 170 of the component adheres to that side of the mounting film 150 facing towards the surface of the component 170. The adhesive film 160 has an adhesive layer on the side facing towards the surface of the component 170. In particular, the adhesive film can be formed by a carrier film and a single-layered or multilayered paint layer affixed thereto, and also the adhesive layer arranged on the side facing away from the paint layer. The adhesive film 160 may be a film part or else a plurality of film parts, for example, individual letters or ornaments or similar intended to be applied together to the surface of the component 170.

The frame composed of the sub-frames 130 and 140 is configured to form, together with the surface, which is to be provided with adhesive, of the component 170 and the elastic membrane 120, a negative-pressure chamber 141 in which the mounting film 150, including the adhesive film 160, is located and into which the elastic membrane 120 can curve when a negative pressure or a vacuum is applied to the negative-pressure chamber 141. For this purpose, the negative-pressure frame 140 is adapted to the geometry of the surface of the component 170 such that form-fitting contact between the component 170 and the negative-pressure frame 140 is ensured.

An elastic sealing element 144, via which the frame is sealingly connected to the component 170, is fixed at the edges of the opening of the frame defined by the sub-frame 140. The negative-pressure chamber 141 can be evacuated via a connection 148, which is coupled to a negative-pressure source, and the channel 146 which is guided through the sub-frame 140.

The tool 100 furthermore comprises a plunger means 200 formed by a cylinder 201, an extendable piston 202 and a plunger head 203.

FIG. 1 represents the state of the tool 100 with the adhesive film 160 contained therein in the starting state at the beginning of the performance of the method. In this state, the pressure between the negative-pressure chamber 141 and the pressure equalizing chamber 112 is equalized. The same pressure prevails in both chambers 141 and 112, for example, atmospheric pressure (ambient pressure) or a negative pressure of 100 mbar. The elastic membrane 120 is not deflected, that is to say not curved.

FIG. 2 represents the state during the further performance of the method, in which the elastic membrane 120 has been deflected in the direction of the component 170. In this state, the elastic membrane 120 is curved. Its convex side presses the mounting film 150 and in particular the adhesive film 160 adhering thereto against the surface of the component 170. The elastic membrane 120 is deflected by the extended plunger and a pressure difference between the negative-pressure chamber 141 and the pressure equalizing chamber 112, wherein a lower pressure prevails in the negative-pressure chamber 141 than in the pressure equalizing chamber 112.

This state of the pressure difference can be achieved by lowering the pressure in the negative-pressure chamber 141. This can be effected by evacuating the negative-pressure chamber 141 via the connection 148. When the valve 114, which is provided to vent the pressure equalizing chamber 112, is opened at the same time, the negative pressure in the negative-pressure chamber 141 and the atmospheric pressure prevailing in the pressure equalizing chamber 112 have the effect that the elastic membrane 120 is deflected in a curved shape in the direction of the surface of the component 170. In other examples, provision may also be made for the regions on both sides of the elastic membrane 120, that is to say both the negative-pressure chamber 141 and the pressure equalizing chamber 112, to be evacuated first. In this phase, the elastic membrane 120 does not move yet, at least as long as the same pressure prevails on both sides. Only then is the pressure equalizing chamber 112 vented such that the increase in pressure in the pressure equalizing chamber 112 then deflects the elastic membrane 120 in the direction of the component 170, at least as long as the membrane is not already in a curved state as a result of a corresponding pressure of the plunger means.

Due to the curvature of the membrane 120, the mounting film 150 along with the adhesive film 160 is pressed onto the surface of the component 170. A first contact region 162 is generally formed between the adhesive film 160 and the surface of the component 170, the first contact region spreading out radially as a result of an increasing negative pressure. Residual air, which is possibly still located between the adhesive film 160 and the surface of the component 170, can thus always escape on the shortest path towards the outside. When the contact region spreads out further in the further course of the process, the entire area of the adhesive film 160 comes into contact with the surface of the component 170 due to the full-area pressing on by the elastic membrane 120 and adheres reliably to the surface of the component 170 as a result of the adhesive layer.

Prior to or parallel to formation of a pressure difference between the negative-pressure chamber 141 and the pressure equalizing chamber 112, the piston 202 of the plunger means 200 extends with the plunger head 203 located thereon and presses the elastic membrane 120 in a punctiform manner against the surface of the component 170, wherein the adhesive film 160 lies between the membrane 120 and the component 170. As a result of this measure, the shape of the component 170 is stabilized and the component 170 may, for example, be an easily deformable, thin metal sheet, is prevented from being deformed, due to the negative pressure that prevails in the negative-pressure chamber 141, and yielding or curving in the direction of the interior of the tool 100.

After pressing the adhesive film 160 onto the surface 170 has concluded, the negative-pressure chamber 141 and the pressure equalizing chamber 112 can be vented. The membrane 120 can then return back into the starting state. For this purpose, the plunger means 200 also needs to return into the starting state. In general, the mounting film 150 is then pulled off from the adhesive film 160. The adhesive film 160 remains on the surface 170.

The invention claimed is:

1. A method of applying an adhesive film to a component comprising:
   providing a component,
   providing an adhesive film comprising an adhesive layer,
   applying the adhesive film to a surface of the component, wherein, to apply the adhesive film:
   the adhesive film is positioned between the surface of the component and an elastic membrane,
   the elastic membrane is transferred at least in certain regions into a curved state with a convex and a concave side and is brought into contact with the surface of the component with the convex side first such that the adhesive layer of the adhesive film is pressed onto the surface of the component in a full-area manner by the elastic membrane,
   the adhesive layer of the adhesive film is pressed onto the surface of the component in a full-area manner by a negative pressure being applied to that side of the elastic membrane facing towards the adhesive film, and
   to stabilize the component against deformation brought about by this negative pressure, the elastic membrane along with the adhesive film is pushed against the surface of the component with a plunger means,
   wherein the at least one plunger means comprises at least one extendable piston and a plunger head; and
   the plunger head is advanced in coordination with the setting of the negative pressure.

2. The method according to claim 1, wherein at least one of:
   the negative pressure applied to that side of the elastic membrane facing towards the adhesive film is present relative to a pressure applied to that side of the elastic membrane facing away from the adhesive film and/or a pressure which is applied to a rear side of the component,
   the negative pressure is a pressure <1 bar, and
   to set the negative pressure, a negative-pressure chamber delimited by that side of the membrane facing towards the adhesive film, and a pressure equalizing chamber delimited by that side of the membrane facing away from the adhesive film, are evacuated, whereupon the pressure equalizing chamber is vented.

3. The method according to claim 2, wherein at least one of:
   the advancement of the plunger head is coordinated with the setting of the negative pressure by temporal coordination, and
   advancement of the plunger head is coordinated with the setting of the negative pressure in dependence on the negative pressure actually set.

4. The method according to claim 1, wherein at least one of:
   the elastic membrane is composed of an elastic polymer material,
   the elastic membrane has a uniform thickness, and
   the elastic membrane has weakened regions and/or reinforcing regions that influence the geometry of the curved state in a targeted manner.

5. The method according to claim 1, wherein at least one of:
   the adhesive film is positioned between the surface of the component and the elastic membrane with a mounting film to which the adhesive film adheres by way of its side facing away from the adhesive layer,
   to position the adhesive film, the mounting film is fixed on or in a frame, and
   after the adhesive film has been pressed onto the surface of the component, the mounting film is pulled off from the adhesive film.

6. The method according to claim 1, wherein, in producing motor vehicles and the component is a motor vehicle body or part of a motor vehicle body or an attachment part, the method further comprises:
   a. coating a motor vehicle body or parts of a motor vehicle body with at least one paint,
   b. drying and/or hardening the at least one paint,
   c. mounting attachment parts on load-bearing component parts of the motor vehicle body which has been coated with the at least one paint that has been dried and/or hardened, and
   d. applying the adhesive film to a surface of the motor vehicle body which has been coated with the at least one paint that has been dried and/or hardened or parts of the motor vehicle body or one of the attachment parts mounted thereon.

7. The method according to claim 1, wherein at least one of:
   the adhesive film comprises a carrier film having the adhesive layer on one side and a paint layer on another side,
   the carrier film is a plastics film, a metal film or a metal-plastic composite film,
   the carrier film has a thickness of 10 μm to 120 μm,
   the adhesive layer has a thickness of 10 μm to 80 μm, the adhesive layer has a uniform thickness,
the adhesive layer is composed of a homogeneous adhesive composition,
the adhesive layer has a surface area of 10 cm² to 8 m², and
the paint layer has a thickness of 20 μm to 150 μm.

8. A tool that applies an adhesive film to a surface of a component according to the method of claim 1, comprising:
 a. an elastic membrane that presses the adhesive film onto the surface of the component in a full-area manner,
 b. at least one positioner for positioning the adhesive film between the surface of the component and the elastic membrane,
 c. means for generating a negative pressure on a side of the elastic membrane facing towards the adhesive film and/or means for generating a negative pressure on a side of the elastic membrane facing away from the adhesive film, and
 d. at least one plunger that pushes the elastic membrane along with the adhesive film against the surface of the component to stabilize the component during application of the adhesive film,
  wherein the at least one plunger means comprises at least one extendable piston and a plunger head; and
  the plunger head is advanced in coordination with the setting of the negative pressure.

9. The tool according to claim 8, further comprising:
a frame configured to form, together with the surface, which is to be provided with adhesive, of the component and the elastic membrane, a negative-pressure chamber in which the adhesive film is arranged and into which the elastic membrane can curve when a negative pressure is being applied to the negative-pressure chamber.

10. The tool according to claim 9, wherein at least one of:
the frame is of rectangular configuration,
the frame has a first opening which is closed by the membrane,
the frame has at least one elastic sealing element which can rest sealingly on the surface of the component,
the frame comprises a second opening, the at least one elastic sealing element being fixed to the edges of said second opening,
the frame comprises at least one connection for a negative-pressure source, via which negative pressure can be applied to the negative-pressure chamber, and
the frame comprises at least one holder as a means for fixing the adhesive film.

11. The tool according to claim 9, wherein at least one of:
the frame is assembled from two or more sub-frames,
the frame is of rectangular configuration and assembled from the two or more rectangular sub-frames,
the frame comprises a first rectangular sub-frame, on which at least one elastic sealing element is fixed and which comprises at least one connection for a negative-pressure source, and
the frame comprises a second rectangular sub-frame, comprising at least one holder for the adhesive film.

12. The tool according to claim 8 further comprises:
a pressure equalizing chamber delimited by the elastic membrane,
at least one connection for a pressure source or a negative-pressure source, said at least one connection leading into the pressure equalizing chamber, and
at least one valve via which the pressure equalizing chamber can be vented.

13. The tool according to claim 8, arranged in a production line that produces motor vehicles.

* * * * *